United States Patent [19]

Boulia et al.

[11] Patent Number: 4,594,674
[45] Date of Patent: Jun. 10, 1986

[54] GENERATING AND STORING ELECTRONIC FONTS

[75] Inventors: Dorothy I. Boulia; Michael W. Pousson, Jr.; Edward J. Pring; Nancy L. Stone, all of Tucson, Ariz.

[73] Assignee: International Business Machines Corporation, Armonk, N.Y.

[21] Appl. No.: 467,973

[22] Filed: Feb. 18, 1983

[51] Int. Cl.⁴ .............................................. G06F 9/00
[52] U.S. Cl. .................................................. 364/523
[58] Field of Search ... 364/200 MS File, 900 MS File, 364/523, 200, 900

[56] References Cited

U.S. PATENT DOCUMENTS

| | | | |
|---|---|---|---|
| 4,078,249 | 3/1978 | Lelke | 364/200 |
| 4,195,338 | 3/1980 | Freeman | 364/200 |
| 4,300,206 | 11/1981 | Belleson et al. | 364/900 |
| 4,345,245 | 8/1982 | Vella et al. | 364/900 |
| 4,353,653 | 10/1982 | Zimmerman | 364/900 |
| 4,359,286 | 11/1982 | Barnes et al. | 364/900 |

OTHER PUBLICATIONS

IBM Manual SH20-1794-2 Printext/370 Program Reference, 1980.
Adams, "Playing Tag with Automated Text Processing", Proceedings of the International Technical Communications Conference, May 1981.
IBM Manual SH20-9161-3 Document Composition Facility: User's Guide, 1982.

Primary Examiner—Gareth D. Shaw
Assistant Examiner—John G. Mills
Attorney, Agent, or Firm—H. F. Somermeyer

[57] ABSTRACT

A large plurality of electronically-stored fonts are managed and selected for use in a particular presentation (printing, display) of a document represented by electrical signals by either an explicit or implicit method. A new font by either selecting a completely defined font or by selecting predetermined characteristics of font graphics, such as italics, bold, point size, and the like which enable an implicit selection of a completely defined font. Such defined characteristics are interpreted by an automatic machine to complete font definitions for use by a document presentation device. A begin font command can specify a plurality of internal fonts with the order of specification indicating priority of selection for use in document presentation. Whether or not a specified internal font results in a defined font being activated is selectable by font definitions embedded with a received-text-data stream representing text/graphics to be presented. Such combination yields a presentation device and font independency to the unformatted input-text-data stream.

10 Claims, 11 Drawing Figures

GENERATING AND STORING ELECTRONIC FONTS

DOCUMENT INCORPORATED BY REFERENCE

U.S. Pat. No. 4,031,519 shows a non-impact, laser-type printer with which the present invention may be advantageously employed as a document presentation device.

BACKGROUND OF THE INVENTION

The present invention relates to computerized generation and storage of electronic fonts, such fonts are suitable for typesetting, printing, CRT display and other forms of document presentation. Fonts of all types play a key aesthetic role in typesetting and printing. A history of the relationship of the typographic art to font generation is set forth in the book "POCKET PAL, A GRAPHIC ARTS PRODUCTION HANDBOOK" by International Paper Company, 220 E. 42nd Street, New York, N.Y., copyrights 1963-1979. This book traces typesetting and font control from handset type through automated mechanical typesetters, photo-composers, impact composers, and electronic fonts used with non-impact or impact document presentation devices. At an early stage of the typographic art, it was recognized that computerization of the composer input could provide significant advantages and efficiencies. For example, many composers receive their input from a digital computer which represents the graphics to be printed in terms of electrical signals. Generally, the early computer-driven composers required the digital computers to use so-called "coded data" wherein each graphic was represented by a byte or two bytes of code permutations. The composing machine interpreted the coded data to generate graphics in a visual form.

Examples of early computerized input to printers and composition devices include the output writer for CO-BOL, TEXT-90 (used on the IBM 7090 data processing machine), as well as PRINTEXT 360 and 370 computer programs. These computer programs generally operated with either photocomposers or electronic font-type composers. In particular, PRINTEXT 370 (IBM programming RPQ EF3414, bearing program number 5799-ALR, as described in IBM publication SH20-1794), allows the program a lot of flexibility in defining a font. A font, for purposes of PRINTEXT 370, includes a set of graphic characters, a corresponding set of widths for the characters, and a table to indicate how to output characters for a composer or typesetting device. That is, a directory is provided which translates coded data representative of graphic characters to addresses usable by the typesetting device for addressing stored graphic patterns corresponding to the graphics to be printed. In some machines, such stored graphic patterns are in the form of an optical array or mask, either circular or rectangular, which is movable such that a beam of light can be directed through the optical mask or character onto a photosensitive surface. The character set of PRINTEXT 370 allows a font to contain up to 255 characters. Each number, from 1 to 255, identifying a graphic pattern or character is called a font recode number. PRINTEXT 370 provides input keyboard tables which translate the keyboard coded data into the font recode number. In this manner, the internal text processing of PRINTEXT 370 is independent of keyboard table restrictions. Such input translation is useful in a multilingual environment.

PRINTEXT 370 also introduced a so-called logical font, the font processed by PRINTEXT 370. Correspondingly, the output device has a physical font, i.e., the actual shape of the graphics to be printed in accordance with the PRINTEXT 370 logical font. All of the logical and physical fonts are defined in so-called font tables. Additionally, for text output, a plurality of printer graphics tables are provided for translating the font recode number into device symbols. Remember, each character in the font had a font recode number defined in the keyboard table. That recode number is used to access or address the graphic representation of the character on the printer display or typesetter.

Accordingly, PRINTEXT 370 provides device independent text processing through the use of input translating tables called keyboard tables and output translating tables called printer graphics tables. The font management, other than selection and identification of the graphics character, is handled in the printer or composition machine. In general, in a photocomposer a change of font would require a change of the optical mask. In those machines using a CRT (cathode ray tube) as an output printing device, the electronic fonts are loaded automatically through an IBM 1130 system or through an IBM 360 computer into the storage of a photocomposer. In essence, PRINTEXT 370 (and its predecessor programs) is a formatting program, which formats the document to be presented, selects the fonts but does not directly manage a font graphic pattern. Further, PRINTEXT 370 requires that each font and each graphic character be explicitly defined in the keyboard and printer graphics tables. This relationship is true even though symbols can be shared in a printer through a plurality of diverse keyboards by mixing keyboard tables and printer graphics tables.

A more flexible formatter is found in the computer program entitled "Document Composition Facility" (DCF), IBM licensed program number 5748-XX9 and described in IBM publication SH20-9161. This computer program introduced the concept of generalized markup language tags for improving the human factors of using a formatter program. Such tag markups are described in IBM publication SH20-9188 and in an article by W. B. Adams entitled "Playing Tag With Automated Text Processing", published in PROCEEDINGS OF THE INTERNATIONAL TECHNICAL COMMUNICATIONS CONFERENCE, held by the Society of Technical Communications, Pittsburgh, Pa. in May 1981, on pp. A1-A7. The GML tag concept plus a to-be-described dual level control of font definition provided enhanced flexibility of DCF over the PRINTEXT 370 program. DCF employs control words for handling the various text-related functions. In particular, in the font control and implementation area for a given text processing job, a plurality of fonts can be defined in either one of two methods with the implementation or actuation of the fonts occurring subsequent to the definition and somewhat independent of the timing of the definition. In particular, three control words are of interest. The first is the "define font" control word ".DF" which defines so-called internal fonts (internal to DCF) which may include underscoring, overstriking, capitalization, font changes on electronic font document presentation devices, and pause for impact element changes, such as for an electronic typewriter. This DCF control word will be detailed later.

During the text processing by DCF, a "begin font" control word ".BF" initiates or actuates a font by specifying the font in which the subsequent text is to be formatted. Additionally, the begin font control word causes DCF to save the current font identification before beginning formatting with a new font. This operation enables a subsequent control word to easily regain the previous font for continued text processing. If a given font has been actuated by .BF is to be changed, a previous font control word ".PF" restores the most-recently used font and eliminates the last-actuated font. As an example, one can imagine composing text in lower case letters. If a phrase is to be underscored, then a begin font control word causes the underscored version of the font to be used. Upon completion of the underscoring, a previous font control word causes return to the lower case font and eliminates the underscored font. The same technique can, of course, be applied to italics and other forms of font changes.

Returning to the define font control word, that control word includes an identifier which must be used by the later expected begin font control word to activate the font that is being currently defined. In the define font control word is a font-ID which specifies the internal DCF identifier of the font being defined by the define font control word. Other parameters are added to the font-ID to specify underscoring, upper case, both upper case and underscoring, stopping an output device such as the typewriter, for enabling font changing as by changing the type ball or font disk in a photocomposer, overstriking control, repeat controls, identification of the character or graphic to be used in the overstriking, selection of a box character set for drawing lines and creating boxes, identifying an external font to be used and the name of such external font. In DCF, coded fonts may be specified by the host processor through a so-called character (CHARS) option of a formatting command as described in the referenced IBM publications. The receipt of a define font control word completely replaces any previously defined font using the same identifier. This replacement is necessary to provide data integrity.

The begin font control word which activates a defined font, specifies the font-ID which refers to the font identified through a define font control word. If there is no correspondingly defined font, then the begin font control word becomes a no-operation control word, i.e., the current font used in the formatting is maintained. This two-level control enables a plurality of fonts to be defined for a text processing job with each of the defined fonts being actuated or implemented on a selective basis.

The "previous font" control word merely resumes the use of the previous font that was saved by the immediately preceding begin font control word. If there is no previously saved font, then the current font will remain effective, i.e., the previous font control word becomes a no operation. In DCF, a font save stack could save sixteen different font identifications.

All of the above-described flexibility and control for text processing requires that an operator or user explicitly specify the font-ID or other name of the font as used in the define font control word. Therefore, each begin font control word has to rigorously correspond to the defined font, insofar as identification is concerned, otherwise, the control word is ignored. This means that all of the definitions require a list of the parameters and a memorization of those parameters by the user. While the two-tiered control word approach provides good control, yet better human factors and device independence is required, particularly with the advent of the flexible all-points-addressable printers and the extensive use of cathode ray tubes for document presentation. The above-described DCF program handles coded data for formatting a document to be presented. DCF did not manipulate the actual graphics patterns nor provide control of same except by identifying same.

Electronic fonts provide greater flexibility in document presentation, as will become apparent. An example of a printer using electronic fonts is the IBM 3800 printer. This printer receives graphic characters as electrical signals representing rectangular arrays or raster patterns of dots to be printed. Such electrically represented raster patterns replace the optical disks of the photocomposition machines. A brief description of the IBM 3800 printing subsystem and its support programming is found in IBM Publication GC26-3829 (December 1975). The 3800 receives electronic fonts in the form of raster patterns with an associated character arrangement table. The character arrangement table is a directory for converting the coded data, which represents graphics characters, into addresses for addressing the respective raster patterns stored in the 3800.

The support programming for the 3800, which resides and is used by the host processor to which the 3800 is attached, includes an IEBIMAGE program. This program allows modification of the character arrangement table including the directory portion referring to the raster patterns such that the character arrangement table can refer to various sets of raster patterns. For example, a first set of raster patterns is provided for usage in the United States, which includes 64 characters. When the 3800 is used in European countries, a so-called World Trade National Graphics provides graphic patterns for adapting the character sets to the various countries of Europe. IEBIMAGE can modify the character arrangement table to substitute certain graphic characters for graphic characters in the original set. The graphics character patterns are stored on direct access storage devices in a data area called SYS1.IMAGELIB. With this type of storage, to provide a font for printing in English, the original character arrangement table is referenced; for printing in German, a different character arrangement table is referenced which substitutes certain other national use graphics for some of the English graphics for avoiding storing complete fonts for the various languages or font modifications to be used with the 3800 printer. The character arrangement table is a directory in the same sense that the printer graphics table of the PRINTEXT 370 is a directory to graphic symbols.

Even with all of the above-described efficient controls for text, particularly font data, for composing printers, such as usually employed in data processing environments, a need for greater human factors in the formatting area still exists for more efficient use of editor's time and greater device independence of the programmed formatter such that changes in devices for document presentation are not reflected into the application programs which generate text and graphics to be presented. These factors become more negative as the number of available fonts increase; with "electronic fonts" the number of available fonts can increase dramatically. Accordingly, it is desired to more efficiently and easily accommodate a large number of fonts.

SUMMARY OF THE INVENTION

It is an object of the invention to provide a graphics formatter which enables implicit selection of sets of graphics, such as fonts.

It is another object of the invention to provide in a programmed graphics formatter a prioritizing of graphics selection which can be explicit or implicit.

In accordance with the invention, a large plurality of electronic fonts or other forms of graphics are managed by storing electrical representations of patterns of a large plurality of graphics as font or graphics objects such that each symbol being represented, or each image being stored, is addressable by a character or symbol-ID. Each object preferably has a family name relating to a plurality of such objects. An electronically stored index to all of the objects is arranged by the family name. A large plurality of directories, herein also termed "translate tables", called "Code Pages", which relate coded data to the stored graphics in the respective objects, are stored independently of the objects. A coded font or graphics index is created having a name with a first pointer to one of the code pages for selecting the directory and a second pointer to an object for completing a defined set of graphics.

In a second aspect of the invention, an initial or first coded font is activated as a current font. A second coded font can be activated by combining the information in the index with the current font for creating a second coded font for presenting a document having the first and second fonts from the same family of fonts, one font having given characteristics (Italics) while the other font has other graphic attributes or parameters.

In another aspect of the invention, activation of a font includes an implicit priority of selection. A begin font control word or instruction includes a plurality of parameters or font identifications listed in a given order. When executing the begin font control word, the first-listed parameter or identification is compared with a plurality of previously defined fonts or graphics sets. If no match is found, then the second-listed parameter or font identification is compared with previously defined fonts or graphics sets. If a match is found, then that second-defined graphics set is employed in text formatting. This procedure can be repeated through a large plurality of parameters or font identifications such that the begin font control word can relate to a plurality of diverse document presentation devices with program execution activating a font corresponding to the device without intervention by a user or operator. The defined fonts preceding the begin font control words are selectively stored such that a diversity of output document presentation devices can be employed and changed by merely changing the definitions of the fonts or graphics sets without changing the begin font control words.

The foregoing and other objects, features, and advantages of the invention will be apparent from the following more particular description of preferred embodiments of the invention, as illustrated in the accompanying drawings.

DETAILED DESCRIPTION

Figure 1:
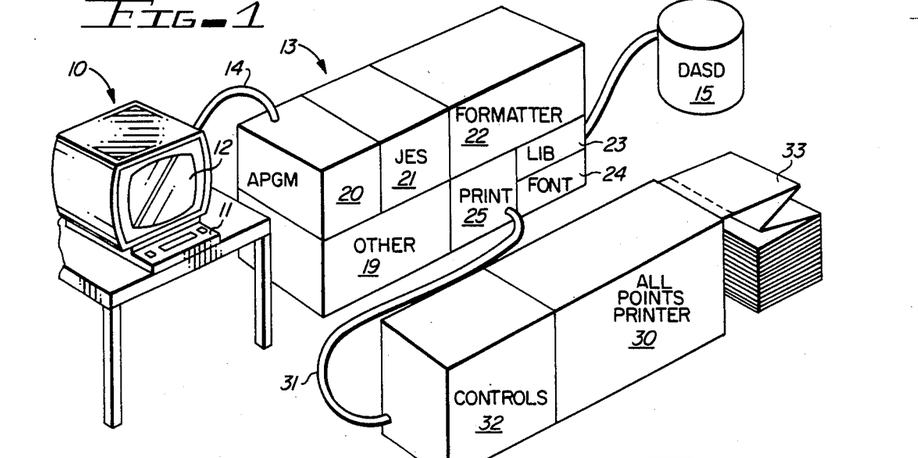
FIG. 1 illustrates a computerized document presentation system employing the present invention.

Referring now more particularly to the drawings, like numerals indicate like parts and structural features in the various diagrams. The general-operating environment in which the present invention preferably is practiced is shown in FIG. 1. An operator-interactive terminal 10 has a keyboard and associated graphics display, such as CRT 12. The interactive terminal 10 is suitably cabled to a programmed digital computer 13 via cable 14. Cable 14 also diagrammatically represents any input/output multiplexing and channel controls, as are widely practiced in the data processing art. Computer 13 has its own data storage 15, preferably in the form of direct access storage devices, DASD. The hardware construction of computer 13 follows general purpose digital computer design, such as used by International Business Machines Corporation, Armonk, N.Y., in machines identified as the 3031, 3033, 3081 and 4300 series, for example. FIG. 1 illustrates computer 13 in a logical form wherein each program of significance to practicing the present invention is shown as an internal block portion of the computer. APGM 20 is an application program associatable with interactive terminal 10. A typical APGM 20, when practicing the present invention, would be a text-editing program. Further, APGM 20 can be a payroll or other form of program which results in printout or display using formattable text and graphics, as will become apparent. A job-entry system, JES 21 interfaces with the usual data processor or computer operating system which is included in other programs 19. JES 21 assigns jobs to various programs in response to job control language (JCL) inputted through interactive terminal 10 or through other means, as is well known. When APGM 20 has completed its functions and it is desired to have a document composed and formatted, then JCL is entered into computer 13 activating JES 21 to initiate operation of text and graphics formatting by formatter 22. Formatter 22 can consist of a program such as the Document Composition Facility, IBM program no. 5748-XX9. The present invention provides certain enhancements over the formatting capabilities of the Document Composition Facility, Release 2, as described in IBM publication GH20-9158-2, entitled, "Document Composition Facility and Document Library Facility, General Information". A Document Library Facility, LIB 23, provides for accessing DASD 15 with respect to certain textual and control information usable by the Document Composition Facility or formatter 22. Since the formatter 22 is only concerned with formatting documents, a font program 24 (font 24), provides font information to formatter 22. Generally, formatter 22 will work with identification of fonts rather than the actual font symbols as represented by raster patterns or vector patterns, as stored in DASD 15. Formatter 22, upon completion of formatting a document including identification of fonts, either independently or via font 24, initiates print program 25. Print program 25, also termed an output writer, is designed to operate and supply textual and graphics data to an output printer, such as all-points-addressable printer 30. Printer 30 receives commands and data from computer 13 via input/output or peripheral cable 31. Cable 31 diagrammatically represents the input/output channels and attachment circuits usually found in coupling printer 30 to computer 13. An all-points-addressable printer is exemplified by the IBM 3800 printer, the IBM 6670 Information-Distributor and the like. Such a printer generally has a set of electronic circuit controls 32 for controlling the printer. The printer mechanism is preferably of the electrophotographic type, which is well known in the art. Such printers generally employ tractored paper, i.e., paper with tractor holes on one or both sides of the paper, such paper is usually fanfolded to produce a stack of printed output, as at 33. Typically, an all-points printer 30, if a high-speed printer, may have a burster-trimmer-stacker which automatically processes the printed document. Any type of fast or slow printer or other form of graphics presenting device may be advantageously employed with the present invention.

Figure 2:
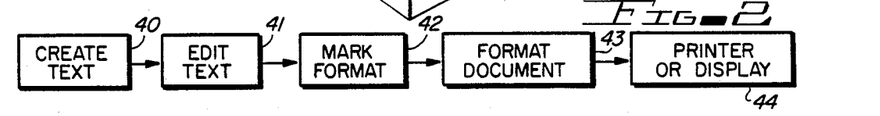
FIG. 2 is a flowchart showing generation of a document using the FIG. 1 illustrated system.

FIG. 2 is a simplified flow diagram illustrating the general flow of document preparation. At 40, text is created. Typically, this can be through an interactive terminal 10 operating with an application program, such as program 20. Other forms of text can be automatically generated, such as by payroll programs, advertising analysis programs, computer simulation programs which simulate various physical and logical manifestations, and the like. At 41, the text is edited. Steps 40 and 41 can occur iteratively or sequentially. At 42, the edited text is marked for formatting such as by the GML (generalized mark-up language) employed with the Document Composition Facility. Such language is a tag-controlled format-marking with enhanced human factors. At 43, formatter 22 formats the document. Formatting a document can occur iteratively with marking a document. However, in the present environment, the formatting chores are taken from the operator for enabling the operator to perform other functions; formatter 22 has sufficient algorithmic controls to aesthetically format the proposed document. Some generalized mark-up (GML) commands tell formatter 22 how to format the document. The formatted electronically represented document is then supplied to a printer or display, as at 44.

Figure 3:
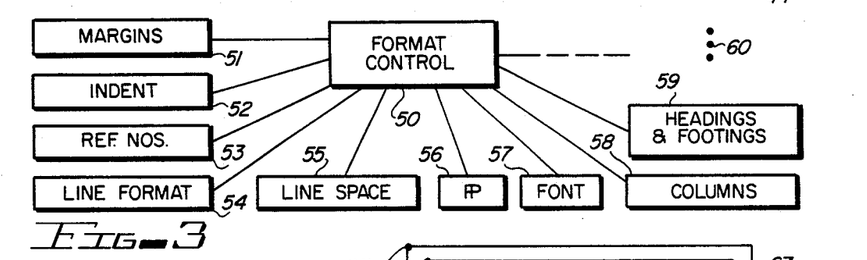
FIG. 3 is a logical arrangement of a formatter in the system of FIG. 1.

FIG. 3 is a simplified showing of a formatter 22. Generally, a formatter has a format control program 50 which synchronizes the operation and coordinates all of the formatting functions. Various specialized functions are performed by program modules within the formatter 22. For example, margins within a logical page, i.e., an area of a sheet of paper which is defined as a page, is controlled by margin control 51. Indenting paragraphs and inserts is controlled at 52. Addition of reference numerals is controlled by REF NOS 53. Line formatting, i.e., line spacing, hyphens, and so forth, is controlled separately at 54 and 55. Paragraphing controls are handled at 56. Font selection and management is handled at 57. Column justification and set-ups are handled at 58. Headings and footings are handled at 59. Other functions are indicated by ellipsis 60. All of these functions are designed to cooperate for defining text and graphics data within a logical page as shown in FIG. 4.

Figure 4:
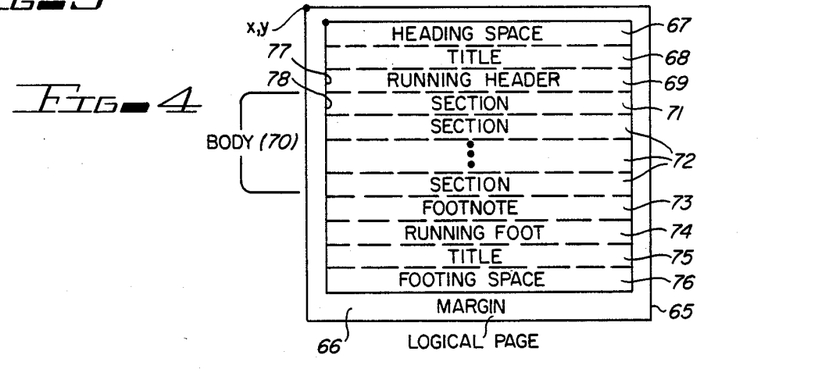
FIG. 4 shows text arrangement in a page of a document formattable by the FIG. 1 illustrated system.

Referring next to FIG. 4, the structure of one type of logical page is illustrated. Logical page 65 is a defined portion of a document-presentation area, such as a sheet of paper or display screen. A logical page can be contiguous with, be one-half of, or any arbitrarily defined portion of a document presentation area. Generally, location of a logical page within a document presentation area is determined by X and Y (abscissa, ordinate) two-dimensional, rectangular-coordinate locations. Within each logical page, a margin 66 is interposed between the textual material to be described and the edge of the logical page. A heading space 67 occurs at the top of a text portion of a logical page. A title space 68 is then provided; when a page has no title, then the vertical depth of the title portion is zero. A running heading 69 occurs immediately below the title section. The next major section is the body 70 of the text. The body is arbitrarily divided into sections 71, 72. Immediately underneath body 70 is footnote space 73. Running footing 74 follows footnote 73. A foot title 75 is provided followed by the footing space 76. Items 67, 68, 75 and 76 are optional items. The size and orientation of a logical page is determined by programming not pertinent to an understanding of the present invention.

Figure 5:
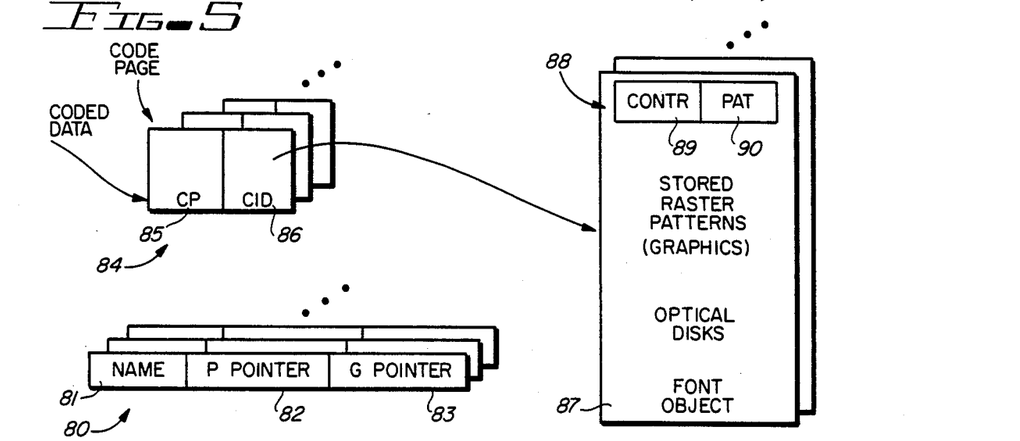
FIG. 5 illustrates a logic structure of font management usable with the FIG. 1 illustrated system.

FIG. 5 illustrates the font management arrangement for document presentation, each font will be preferably a coded font such as font 80. Each coded font includes a name 81, the name is a control symbol for identifying the coded-font data structure as a coded font. A P-pointer 82 points to a code page or directory 84 which correlates coded data with stored raster patterns. The stored raster patterns are indicated by G-pointer 83 which selects one of several font objects 87. In any system, there can be a large plurality of coded fonts 80. In accordance with the present invention, these coded fonts are constructed based either on explicit instructions or using implicit programmed analysis. Each code page, of which there are several and which are independent entities, includes the code-point section (CP) 85 which contains a list of all code points or coded data patterns which are permitted to be used for referring to stored graphic patterns. For each entry in CP 85, there is a corresponding entry in character identification CID 86. CID 86 identifies the relative positions of the graphic patterns within a font object 87. For greatest flexibility, each CID 86 employs the same relative addressing, no limitation thereto intended. The font object 87 preferably stores stored raster patterns, i.e., binary ones and zeros, which represent the configuration of a graphic as a rectangular array of pels (print elements). Each print element is representable by a bit, the bit being 0 indicates background while the bit being 1 represents a portion of the graphic. Such font objects can be stored in DASD 15, optical disks magnetic tapes and the like. In addition to storing all of the graphics raster patterns, font object 87 includes control information 88. Control portion CONTR 89 includes that control information relating to the use of the characters or graphics represented within the font object. PAT 90 represents common pattern characteristics of the stored raster patterns. Such font objects can store alphanumeric characters, mathematical characters, graph-forming characters such as lines, corners, bars, etc., or any other form of graphics usable to represent information in a document. In any system, there can be a large number of font objects which are identifiable, i.e., addressable, through the use of a plurality of G-pointers 83. The arrangement of FIG. 5 allows each coded font to be handled in text processing as two pointers plus a name allowing the identified code page and font object to remain in storage until the document is ready to be presented.

There are three control words that a user at terminal 10 may employ to effect management of fonts using the structure of FIG. 5 and practice the present invention. The first is ".DF" which is a define font control word similar to that employed in Document Composition Facility Release 2 but having added controls as later explained. A second control word is ".BF" which is a begin font control word similar to the begin font control word of the Document Composition Facility Release 2 but having greatly extended capabilities, as will be described. The third control word is ".PF" which is the same as employed for the Document Composition Facility Release 2 and a description thereof being dispensed with for that reason.

The define font control word defines an internal named font for use with the begin font control word. The internal font is linked to one or more externally defined font by define font control words, as will become apparent. This arrangement allows internal formatting functions, such as underscoring and capitalization, to be managed with the begin font and previous font control words. It also allows changing the font-IDs received from the host to be altered and also serves as a means of identifying fonts in a descriptive manner, a key part of the present invention. The define font control word structure includes a field called "font name" which specifies the identifier, used internally in formatter 22, of the font being defined by the present control word. After font name has been defined, the font name (a name internal to formatter 22) may be used with the begin font and other control words. In addition, ".DF" includes the font-ID received from the host as described for the Document Composition Facility. A type field describes the named font being defined in terms of several attributes. These attributes, in a preferred mode of practicing the present invention, include a typeface which gives the name of a font family, such as PI FONT. Such font families or typefaces are well known in the typographic arts. However, it is not necessary to specify a typeface. When a typeface is not specified, other attributes can be used to generically partially describe fonts for facilitating implicit font definitions. A point size in the type field gives the vertical point size of the typeface. The point size may or may not be specified. The weight of the font is also selectively identified in any one of nine classes of boldness from an ultra-light to ultra-bold. If the weight is not specified, the middle or medium weight will be employed. The width portion of the type field indicates the horizontal spacing of characters in a line of text. Very close spacing is called ultra-condensed while very loose packing is called ultra-expanded. Each font has its own spacings; up to nine spacings can be specified for each font. Additionally, attribute identifiers such as italic underscore, or outlines, can be included in the type field. The field "code page" of the define font control word identifies the code page 84 to be used with this particular font. In summary, as many parameters as necessary may be specified within this control word. If both font and type parameters are given, the last one specified will be used. The code page parameter is ignored if the font parameter is also specified, i.e., a coded font is identified. If a named font being defined already exists, then any previous definition is completely replaced by the information contained in the define font control word. When a given named font is defined descriptively with the type parameter and the typeface or point size are not specified, such parameters will remain unchanged when the font is used with the begin font control word, i.e., the begin font control word does not necessarily in and of itself alter font parameters. An example of using the define font control word with the begin font control word is for selectively emphasizing key phrases. The define font control word will be:

.DF emph type (bold ITALIC) "emph" is the internal font-ID. Since neither point size nor typeface are included in the font definition, such parameters will not be changed as a result of a begin font control word, i.e., the typeface and point size of the current font will be chosen to build a new font. The begin font control word merely is:

.BF emph

As a result of the define and begin font control words listed above, subsequent text will be set using a typeface previously identified but in bold ITALIC for emphasis.

The begin font control word always indicates the internal font in which subsequent text will be formatted. The font to be started can be identified as a named font, such as defined by the define font control word or as an external font-ID (via CHARS). Each begin font control word may specify a plurality of internal fonts. The order of listing of the fonts yields a priority of selection; that is, the first valid internal font identified by parsing the begin font control word will be activated. If none of the font names or font-IDs are valid, then the begin font control word defaults to the current font, i.e., as in a no operation. After the begin font control word has been executed, all subsequent text characters are formatted using the specified font. Such specified font will remain in effect until another begin font or a previous font control word causes a font change.

The define font control word can define named fonts which are combinations of external font-IDs and formatting functions, such as underscoring and overstriking. Any named font may be used with the begin font control word. When the named font which was defined with a type parameter in a define font control word is started by begin font control word, descriptive attributes for typeface and point size are only changed when they are specified. As an example, a begin font control word:

.BF hilite will be effective if a previously define font control word defines hilite (an internal identifier). For example, the define font control word:

.DF hilite us up font SI32

Then a begin font control word specifying hilite selects the correspondingly defined font which identifies externally named font "SI32". Such begin font control word may include the single parameter "SI32" which starts the same external font "SI32" but does not include underscore (us) nor uppercase (up).

A user practicing the present invention first defines a font, then enables certain text processing; when the define font is to be used, it will be activated by a begin font control word. Such font activation can follow several different procedures, two of which are detailed below:

One approach to font management from a user view is to internally to the formatter define a font, i.e., use an internal word as an index to a font. For brevity only one font will be defined and activated, it being understood that in a practical formatting situation that a plurality of fonts, such as ten or more, may be defined and activated in a document presentation sequence involving a plurality of documents from a dataset. The font is first defined as follows:

.DF hil up us
  .IF &$PDEV eq 3800 .DF hil font &$CHAR(2) us
  .IF &$PDEV eq 38PP .DF hil type(bold italic) us The above define font control words indicate that hil is an internal name or identifier for a font. There are two conditional commands (.IF) which respectively select a font defined in the CHARS option for use on the 3800 printer or a bold italic font for use on a 38PP printer. The above illustration shows that concatenated define font control words can be used within the format and that a plurality of output devices can be employed, each device having its own font; that is, hil is used as an index to device-dependent font selection. If neither the 3800 nor 38PP printer is being used for document presentation, then the defined font "hil up us" is used for other data presentation devices. Such concatenation is useful for printers having diverse print characteristics or used for different types of document presentation.

The above-referred to CHARS option is found in the existing formatter called Document Composition Facility, IBM Program Product 5748-XX9, Release 2 as described in IBM Publication SH20-9161-2, 1981 and entitled, "Document Composition Facility: User's Guide". The CHARS option is used primarily with the IBM 3800-1 printing subsystem. It is used to identify fonts to be used in a output composed print operation. The CHARS option in programming is specified as:

CHARS (fontl [. . . font4])

The CHARS option requires at least one font to be specified, then all of the fonts specified within the define font control word have to be identified within the above-described CHARS option. If the CHARs option has not been used in the input text data stream, then the default font specified for the logical data-presentation device is used. The logical device is merely a set of blocks and control information in the formatter for referring to one or more physical data presentation devices. In general, the first font specified in the CHARS option becomes the initial font. When formatting using the CHARS option, the job control language (JCL) (input control language for a host processor) parameter must specify the corresponding code page table or in case of the IBM 3800 page printer, a character arrangement table which is an equivalent of the code page, as used in the present application, and such specification must be in the same sequence as the font specified in the CHARS option for the formatter. Further details on CHARS can be found by referring to the IBM publication, which is available through any IBM Branch Office.

Following the above-described font command, intermediate text formatting control words or additional define font control words may be used when the font defined above is to be activated. Activation occurs merely using the begin font control word:

.BF hil

The above begin font control word starts a font using the current definition of the internal font name "hil" as defined by the last define font control word. For the 38PP printer, the font activated depends on the current font at the time the begin font control word is decoded, i.e., includes an implicit definition of the font based upon a bold italic version of the current font (uses the second .IF entry of the .DF).

Another procedure for use with font libraries having a large plurality of fonts is also usable with the present invention. The begin font control word lists functions to provide the ability to define more internal fonts for the formatter for various document presentation devices independent of those presentation devices without losing any formatting function for devices that are line oriented, i.e., not all points addressable.

In this second procedure, a simplified showing of define font control words follows:

.DF ftnt type(8)
.DF super type(6)

Following the above define font control word, it may be desired to format a footnote in a page being formatted. In that case, a begin font control word may be used as follows:

.BF ftnt &$CHAR(1)

In the above begin font control word, there is a priority of font selection. The first font identified "ftnt" in the define font control word which calls an eight-point font. The invention is employed in implicitly completing definition of the font, as later described, in the specified eight-point size. If the named "ftnt" font is not defined, then the formatter automatically selects the font defined in the above-described CHARS option.

The above-two procedures are illustrative of how the present invention can be efficiently implemented in formatting text received in an unformatted manner for selecting any one of a large plurality of fonts using implicit techniques and with device independence in the input text data stream; that is, the input-text data stream can be constructed independent of any device characteristics with the font-selection scheme adding those device dependencies that are implicit in document presentation devices.

Figure 6:
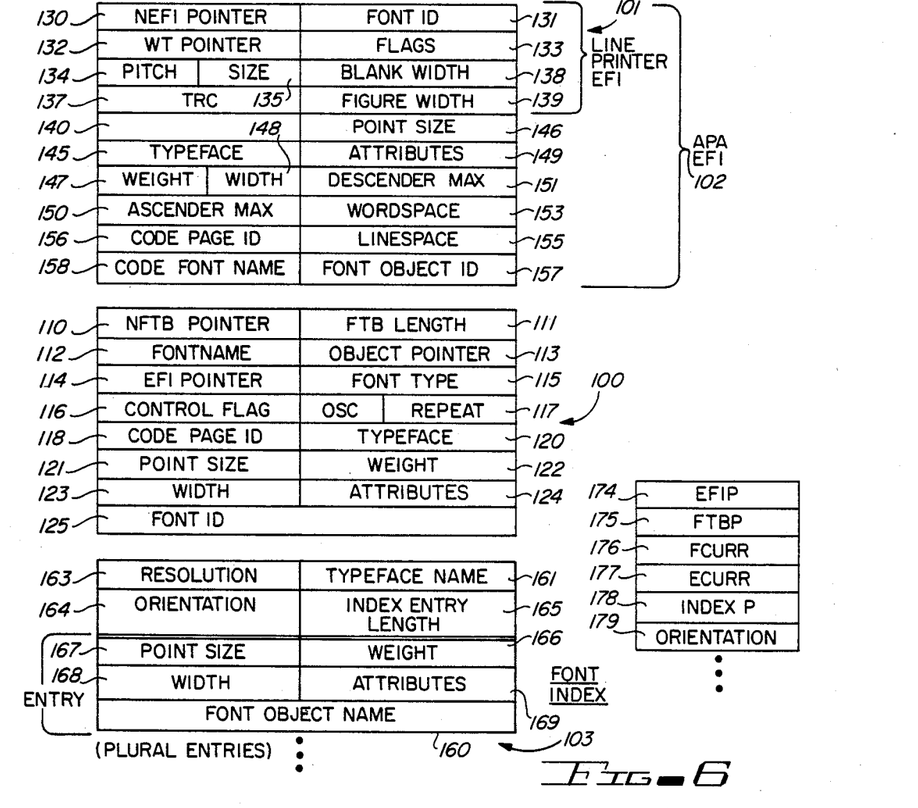
FIG. 6 illustrates data structures used in the formatter of FIG. 1 system for practicing the present invention.

The data structures of the formatter programming necessary for an understanding and practicing the present invention are shown in FIG. 6. These include a detail of the font table block FTB 100, the external font information EFI 102, and the font index 103. FTB 100 is generated through the execution of the define font control word. EFI 102 is a data structure which identifies a font such that a document presentation device can employ that font. One FTB may be associated with a plurality of EFIs, one at a time. One EFI can be simultaneously pointed to by a plurality of FTBs. The font index 103 is generated before any text processing occurs and correlates the above-mentioned family names with all of the font objects 87 which are stored for use in connection with document presentation. The EFI is generated through a begin font control word and can receive input from the FTB, as well as from the font index for implicitly defining a font based upon generic parameters in either a define font or a begin font control word or in both.

FTB 100 consists of a plurality of control and parameter fields. NFTB pointer 110 points to the next FTB in the chain of FTBs. This means that all FTBs in a system are in a singly-linked list for facilitating any FTBs in searching for fonts. FTB length field 111 indicates the size of this FTB. Font name 112 stores any font name received with a define font control word. This entry may be empty. Object pointer 113 points to a font object for constructing boxes, i.e., squares or rectangles in a text environment and not pertinent to an understanding of the present invention. EFI pointer 114 points to the address of an EFI 102 used to implement the font defined in this FTB. This entry may be zeroes which requires the later-described machine operations to either build an EFI or select one for enabling a font to be used in document presentation. Font type 115 stores type information received with the define font control word, previously described. Control flag 116 indicates whether the font is defined in accordance with a typeface or independent of a typeface, i.e., either a rigorous or an incomplete font definition. This flag is used later in determining whether fonts are explicitly or implicitly constructed. Field 117 includes the overstrike character (OSC) indicating overstrike to occur on a line by document presentation devices with a repeat field indicating the number of overstrikes. Code page ID 118 identifies the code page 84 (FIG. 5) which is associatable with the present FTB. In many instances, the FTB when first established will not have a code page ID. Typeface 120 contains the family name of any typeface associatable with the current FTB. In many instances, typeface fields will be empty in that other FTBs can identify a typeface which is implicitly referred to, as will become apparent. Point size 121 indicates the height of the characters to be printed. Weight 122 contains any one of the nine weight indicators receivable with a define font control word. In a similar manner, width field 123 indicates whether the font is compressed or spread out. Attributes 124 indicates whether italics, underscore or outline attributes were received with a define font control word. Font-ID 125 identifies any so-called external font name. In other words, other programming may identify a font by its own identification scheme. In this manner, the begin font having the font-ID can refer to the present FTB and thereby implicitly define fonts whether an internal font name at 112 or an external font-ID (a coded font name) 125 is used.

The external font information EFI 102 is the data structure used to implement document presentation. An EFI can contain information for completing font definition of an incompletely defined font in an FTB. For example, a font referred to in an FTB can be defined only as "italic" with no other parameters being indicated. An implicitly-defined font results in an EFI 102 derived from an FTB 100 through later-described font definition methodologies. Returning now to the rigorously or completely defined font in an EFI, the EFIs are in a singly-linked list via NEFI pointer field 130. The external font-ID is stored at 131. The character width table is pointed to at 132. The width table indicates character widths of the font characters. Such character widths are essential for horizontal justification. Flags 133 contain indicators showing whether or not the font is proportionally spaced as well as other control factors, not pertinent to the present invention. Pitch 134 indicates the characters-per-inch of the defined font. Size 135 indicates the point size. Since an EFI can be used for typefaces, as well as other fonts not typefaces, the size field 135 is flexibly defined. TRC 137 is a control field usable with line-type printers and not pertinent to an understanding of the present invention. Blank width 138 indicates the horizontal spacing between adjacent words. Figure width 139 also indicates horizontal space usable with the present font. Numeral 140 indicates other fields including length-indicating fields may be included in EFI 102. Fields 130–140 constitute a portion 101 of the EFIs containing information required to define an EFI for a line printer. For an all-points-addressable printer, or other document presentation devices, the other fields 145, et seq., are included in EFI 102.

Typeface 145 contains the typeface name corresponding to field 120 of FTB 100. Point size 146 corresponds to point size 121 of FTB 100. Weight and width fields 147 and 148 correspond favorably to the weight and width fields 122 and 123 of FTB 100. Attributes 149 correspond to attributes 124. Ascender max 150 and descender max 151 indicates the maximum distance from the line base line (nominal vertical reference for a line of text) that will occur within the font. This information is useful for vertical justification. Orientation 152 indicates any one of four possible orientations of a font, i.e., portrait or landscape, as well as inverted portrait and inverted landscape. Wordspace 153 indicates the space between adjacent words in a horizontal line of text. Line space 155 indicates the vertical increment between lines. Note that in a line printer, the line spaces are predetermined by printer characteristics, in an APA printer, line spaces can be arbitrarily specified. Code page ID 156 corresponds to code page ID 118. Font object ID 157 indicates the identification of the font object 87. Coded font name 158 can be added for indicating the name of the coded font for the given EFI (fields 156 and 157 rigorously define information for a coded font).

Font index 103 relates typefaces, resolutions and orientations to a plurality of fonts within the typeface. A plurality of font indices 103 are grouped by the typeface family name. Each font index 103 includes the font name 160 corresponding to field 112 of FTB 100. Object name 162 identifies the font object 87 containing the raster patterns representative of the graphics within the named font. The usual addressing techniques based upon table lookup employing object names and physical memory addresses are employed to access the font object. Resolution 163 identifies the pel or print element density of the stored raster patterns. Orientation 164 indicates whether its portrait, landscape or inverted portrait, inverted landscape orientation. Even in all points addressable document presentation devices the resolution and orientation parameters are usually device dependent. Index length 165 indicates the size of the font index record. Size 167 indicates the vertical size corresponding to point size 121 of FTB 100. In a similar manner, weight 166 and width 168 correspond to weight 122 and width 123 of FTB 100. Attributes 169 indicate whether the font is Italic, compacted, Roman, whether the font is underscored, etc. Numeral 172 indicates that other entries may be employed in the font index. Font index 103 is preferably arranged by typeface name such that all fonts within a typeface are clustered in one area of memory. A one-pass address table lookup is employed for accessing the clustered font indices.

Figure 7:
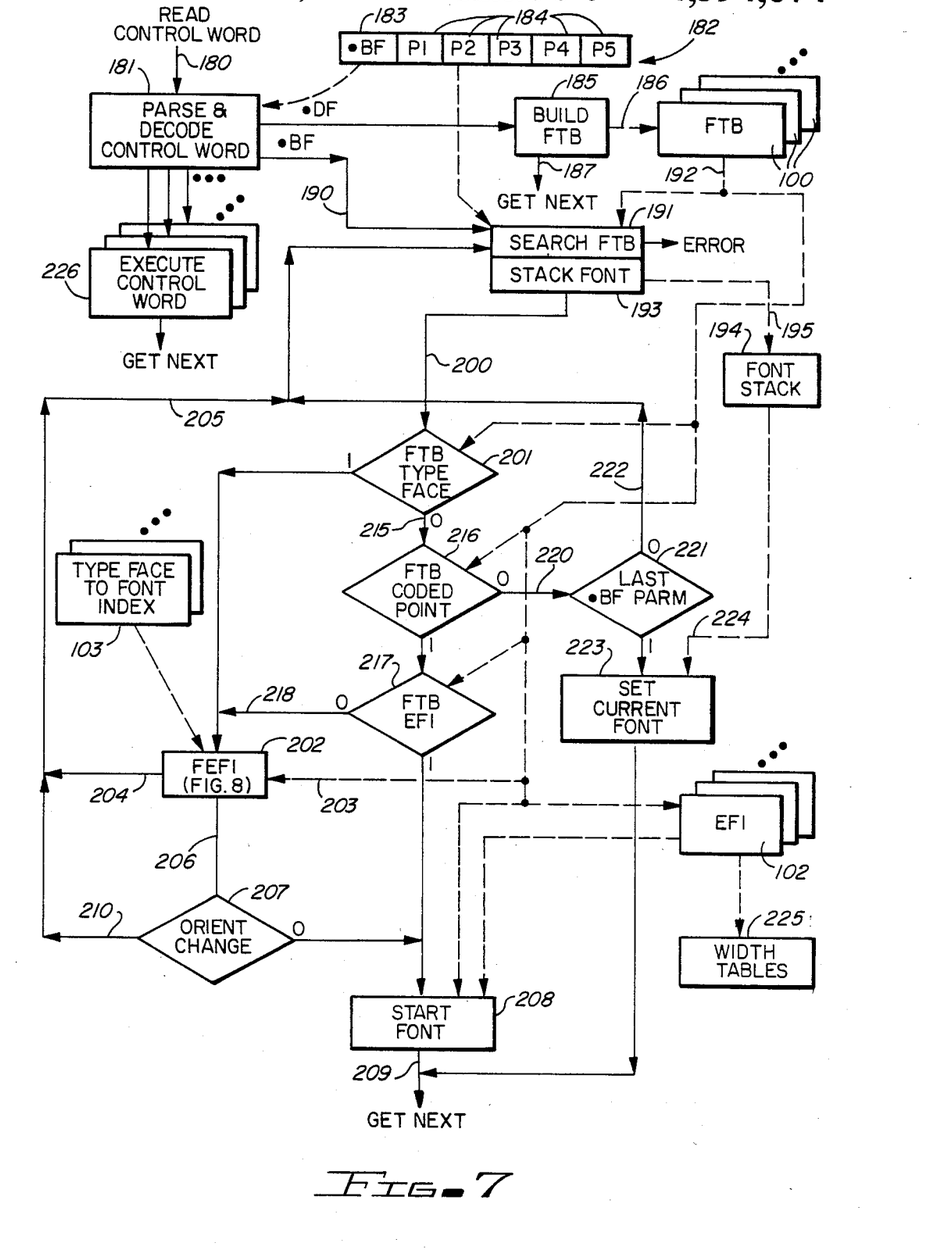
FIG. 7 illustrates the logic of control for font management in the formatter of FIG. 1.

FIG. 7 illustrates the machine operations or programmed logic flow for implementing the present invention within a formatter 22. It is to be appreciated that a formatter 22 performs many text-related functions of which the present invention relates to font management. The description of FIG. 7 assumes that JES 21 has activated formatter 22, and that formatter 22 having a job dispatcher has accessed DASD 15 for obtaining the unformatted text which includes the usual control words as alluded to earlier. At 180 the dispatcher reads a control word (indicated by a period, such as in ".BF"). Upon recognition that a control word has been read, a usual program decoder is activated at 181 to parse and decode the received control word. The control word 182 is shown as being parsed into a plurality of sections. Section 183 contains the identification of the control word which is illustrated as ".BF". Following section 183, there are a plurality of parameter containing sections 184 and individually labeled as P1 through P5. A suitable character can be used to indicate the end of the control word as is commonly practiced in the programming art. Control word 182 is shown as being associated with the decoding step 181 by the dashed-line unnumbered arrow. When a define font control word ".DF" is decoded, the build FTB step 185 is activated. The build FTB step 185 takes the parameters included in the define font control word and stores them into a font table block 100 as indicated by dashed line arrow 186. The machine operations employed for building an FTB includes allocating a portion of data storage such as in main memory of a host 13 and then storing the appropriate parameters in the designated areas of the allocated spaces as indicated in FIG. 6 for FTB 100. Since allocating memory space and transferring parameters from a received control word to build a table which reflects the contents of the received control word is well known, the detailed operations of the build FTB step 185 are dispensed with. Upon completion of building the next FTB which includes single-link chaining via NFTB pointer 110 the new FTB to all existing FTBs, host 13 at 187 then at 187 gets the next control word (get next) via the dispatcher (not shown). A plurality of define font control words may be received in a given sequence at the beginning of a text-processing job. The FTBs that are built condition the formatter 22 for activating the fonts to format the unexpected unformatted text in accordance with the designated output document presentation devices which allows the begin font control word to be device independent.

A received begin font control word causes the decode control 181 to follow logic path 190 to activate step 191 to search all existing FTBs 100. The search FTB step 191 takes the received parameters in the begin font control word and scans the FTBs 100 for identical parameters. Once a match is found, it is possible that an EFI 102 can be built. At this time, it is not guaranteed that an EFI can be built from a generic descriptor in a begin font control word. In any event, the current font is stacked by stack font step 193 in font stack 194 as indicated by dashed line arrow 195. Stack 194 is a LIFO stack of the usual type having a capability of storing 16 font identifications. Stack font 193 takes the current font, which is identified in register FCURR 176 of FIG. 6 and which contains an address to the FTB of the current font and stores it at the top of font stack 194. Additionally, ECURR points to the current active EFI 102. That information is stored along with the contents of FCURR. Then the machine operations follow logic path 200 to determine whether or not a new font can be activated in response to the received begin font control word and whether or not the new font is to be explicitly or implicitly started. Any typeface in an FTB field 102 is identified in step 191, resulting from the search of FTBs 100 beginning with the FTB indicated by register FTBP 175 (FIG. 6), then typeface processing occurs in FEFI (find EFI) of FIG. 8 as activated by step 202. FEFI receives inputs from the font indices 103 as indicated by dashed line 203 and from the identified FTB for determining all of the explicit parameters established through a previously executed define font control word. The current font which is now the top stack font in 194 may also be examined. It is possible that FEFI may not be able to build an EFI 102; that is, the first match between a begin font parameter and the found parameter in the FTB may not be suitable for the output document presentation device intended to present the document being formatted. That is, the top priority device was not selected by the user in the .BF control word. Accordingly, the next priority parameter is then examined. This is achieved by the formatter 22 following logic path 204 from FEFI of FIG. 8 and then path 205 to reinitiate FTB scanning step 191. Step 191 then determines if there are additional parameters in the .BF control word for searching the FTBs beginning again at the FTB identified by FTBP 175 of FIG. 6. If no match is found, then the next parameter of the begin font control word is examined. If no parameter of the begin font control word is found, an error message can be supplied to an operator and the current font can be reestablished by moving the top entry of font stack 194 back into FCURR 176 and ECURR 177. As a result, the received begin font control word appears as a no operation command.

Figure 8:
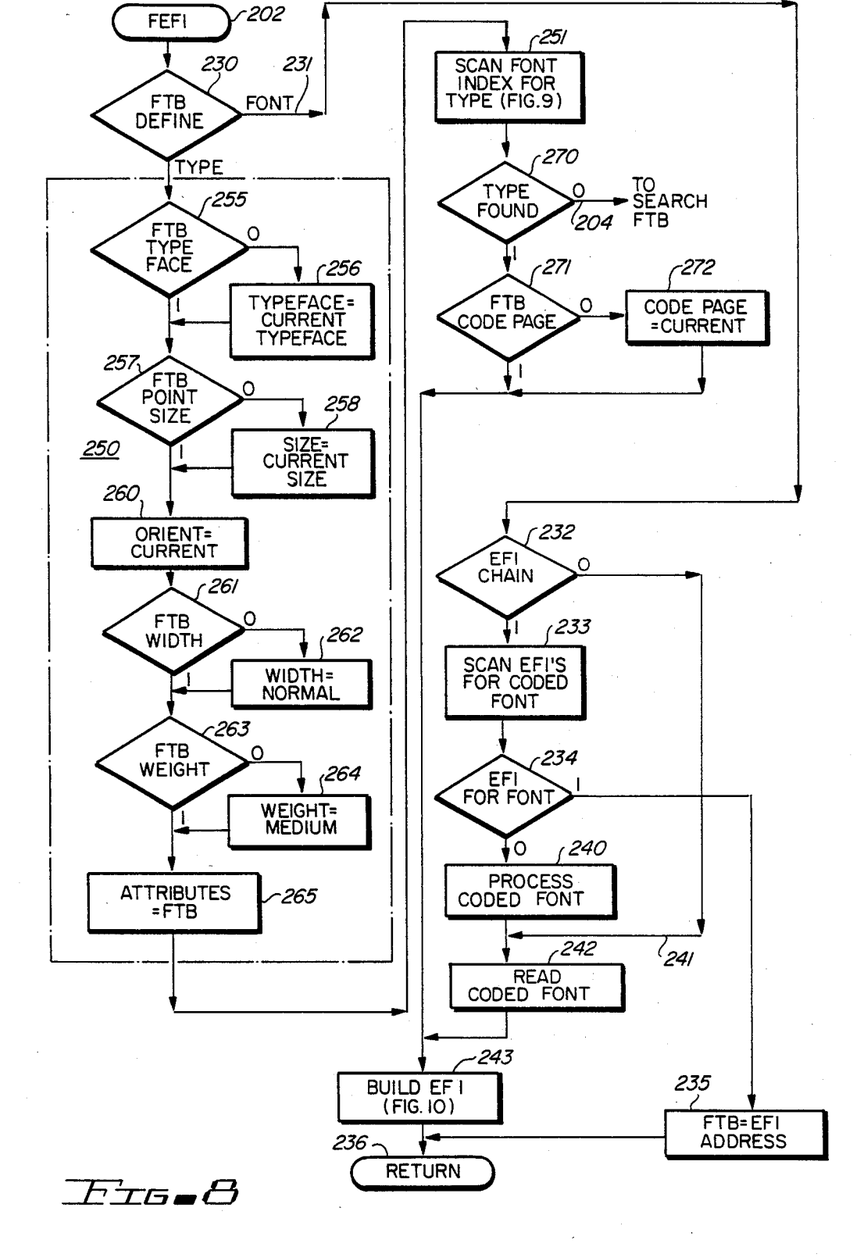
FIG. 8 is a machine operations chart for controlling external font information in connection with the FIG. 7 illustrated system.

FEFI initiated at step 202 may in fact find or build an EFI 102. In that event, formatter 22 follows logic path 206 to branch step 207 to determine if there is an orientation change in the new EFI from the orientation identified in the received non-formatted text via an earlier control word (not shown) used to initially select text orientation and stored in register 179. This detection is achieved by comparing orientation field 164 of the index 103 entry corresponding to the new EFI with the initially selected orientation recorded in register 179. If there is no orientation change, then at 208 the font identified by the above-described procedure is started. This is achieved by putting entries in FCURR and ECURR 176, 177 as well as other miscellaneous housekeeping functions not pertinent to an understanding of the present invention. A begin font control word, cannot change orientation of the document presentation. This control requires the orientation selecting control words mentioned above and other CWs needed for orientation changes not pertinent to the understanding of the invention. In the event of an orientation change resulting from a begin font control word parameter, that begin font parameter must now be ignored with the next lower priority begin font parameter being examined. This is achieved by formatter 22 following logic path 210 to reinitiate search FTB step 191. With no orientation, the identified font is started for formatting operation at 208; the next control word is fetched (get next) as indicated by numeral 209.

When the identified FTB 100 does not contain a typeface entry, then formatter 22 from branch step 201 follows logic path 215 to step 216 to determine if the identified FTB 100 contains a coded font name in font name field 126 which identifies a coded font 80. If a coded font is identified, then at 217 the identified FTB 100 is examined at field 114 to see if there is an address of an EFI already established by a previous begin font control word. If that is the case, then a font has been explicitly and rigorously defined such that the font can be started at 208, as previously described. If there is no EFI pointer 114, then an EFI must be identified or built by FEFI as initiated by formatter 22 following logic path 218. Other machine operations are as described for a typeface-selected font.

If at 216 no coded font is indicated in the identified FTB 100, then formatter 22 follows logic path 220 to step 221. Here, formatter 22 determines whether or not the last begin font control word parameter has been examined. If not, a search FTB step 191 is reinitiated. It should be noted that step 222 could be omitted with the search FTB step 191 performing that function. This step is brought out to accent in the drawings that if all begin font parameters have been exhausted with no EFI being identified or built, then the current font is reestablished, as indicated at 223. The top entry of the font stack 194 is transferred as indicated by dashed line 224 to FCURR 176 and ECURR 177. Then at 209, the next control word is fetched.

As shown in FIG. 7, each EFI 102 has a width table 225 appended to it. Such width tables are known in the art and are not described for that reason. Additionally, FEFI initiated at step 202 may have to implicitly build a font in either typeface processing or font-related processing. This relationship is indicated by the typeface font index 103 being coupled to the FEFI block 202 by the unnumbered dashed line arrow.

It is to be appreciated that formatter 22 executes a large number of control words as referenced in IBM publication SH20-9161, supra. Such actions are indicated collectively by numeral 226, such other functions are not pertinent to an understanding of the present invention and therefore dispensed with. The cycle of reading the control word, executing it and then getting the next control word, of course, is implemented for all control words such that formatter 22 responds to the sequence of control words, as previously described.

FIG. 8 illustrates the machine operations used to find and build a new EFI 102. The machine operations are initiated by step 202 of FIG. 7. Since FEFI can be instituted either for type or font processing which require different machine operations; at 230 the FTB 100 identified in step 191 of FIG. 7 is examined to see if typeface field 120 (FIG. 6) has an entry. If it does not have an entry, then so-called font definition machine operations are performed based upon the coded font name entry 126. At 232, formatter 22 determines whether or not there is an EFI chain, that is, as processing gets started and no EFIs have been built. Formatter 22 examines field EFIP 174 of FIG. 6, the pointer to the first EFI. If there is no EFI chain built, EFIP equals zero. Alternately the first data storage area pointed to by EFIP may have a special character, indicating no EFIs. Assuming that an EFI chain has been built, then at 233 formatter 22 scans the EFI chain for finding an EFI 102 having a coded font name in field 158 that matches the coded font name in field 126 of the FTB 100 identified at step 191. If the result of the scan, as examined at 234, finds an EFI has already been built, then the FTB identified by step 191 receives the EFI address into field 114. Since the EFI has been found, no EFI needs to be built; all font processing is complete. Accordingly, formatter 22 returns to the FIG. 7 illustrated machine operations at 236.

It may be that no EFI has been built for the desired font and no typeface has been named for font processing. From step 234 at 240, a coded font 80 is fetched from DASD 15 based upon the name of the coded font (step 230 indicated the font was named) and stored in main memory (not shown) of host 13. Then at 242, the identified coded font is read such that the P-pointer 82 and G-pointer 83 are available for building an EFI as initiated at step 243. Building an EFI is described later with respect to FIG. 10. Accordingly, for font-defined processing, the font is always explicitly identified, i.e, the define font control word and the begin font control word contain parameters that explicitly and completely define a font to be used in formatting.

For typeface related font processing, formatter 22 in a series of steps selectively designated by numeral 250 determines whether or not the FTB identified in step 191 of FIG. 7 contains certain parameters data necessary for fully defining a font. If not, the current parameters data are employed to implicitly complete the font definition. The first parameter is the name of the typeface; in other words, did the define font control word specify a new type face to be used? At 255, the identified FTB entry 120 is examined. If the FTB entry 120 is empty (no typeface specified), then at 256 the current typeface identified by the current EFI fields for entry 145 is selected. Remember the current EFI is identified in the first entry of stack 194. The next parameter to be analyzed is the point size. At 257, formatter 22 examines entry 146 of the identified FTB to see if a point size is specified. If not, the point size is selected to be the current size by entry 146 of the EFI corresponding to the last current font; otherwise the point size in entry 121 of the identified FTB is used. At 260, the orientation is made the current orientation identified in entry 152 of the current EFI identified as the top entry of stack 194 (.BF cannot change orientation). At 261, formatter 22 examines entry 123 of the identified FTB to determine if a width has been specified for the characters in the font. If not, a normal width is selected at 262. This indication is a part of the native descriptions 88 stored with the font patterns within the respective font objects 87. At 263 the identified FTB is again examined but in entry 122 to see if a weight of character is specified. If not, at 264, the weight is made medium. At 265, the attributes in section 124 of the FTB 100 will be used to build the EFI. It will be remembered that such attributes include italics, and the like. Following explicitly defining certain parameters data including defaulting to predetermined parameters as at steps 262 and 264, formatter 22 proceeds to implicitly define the font.

Figures 9, 10:
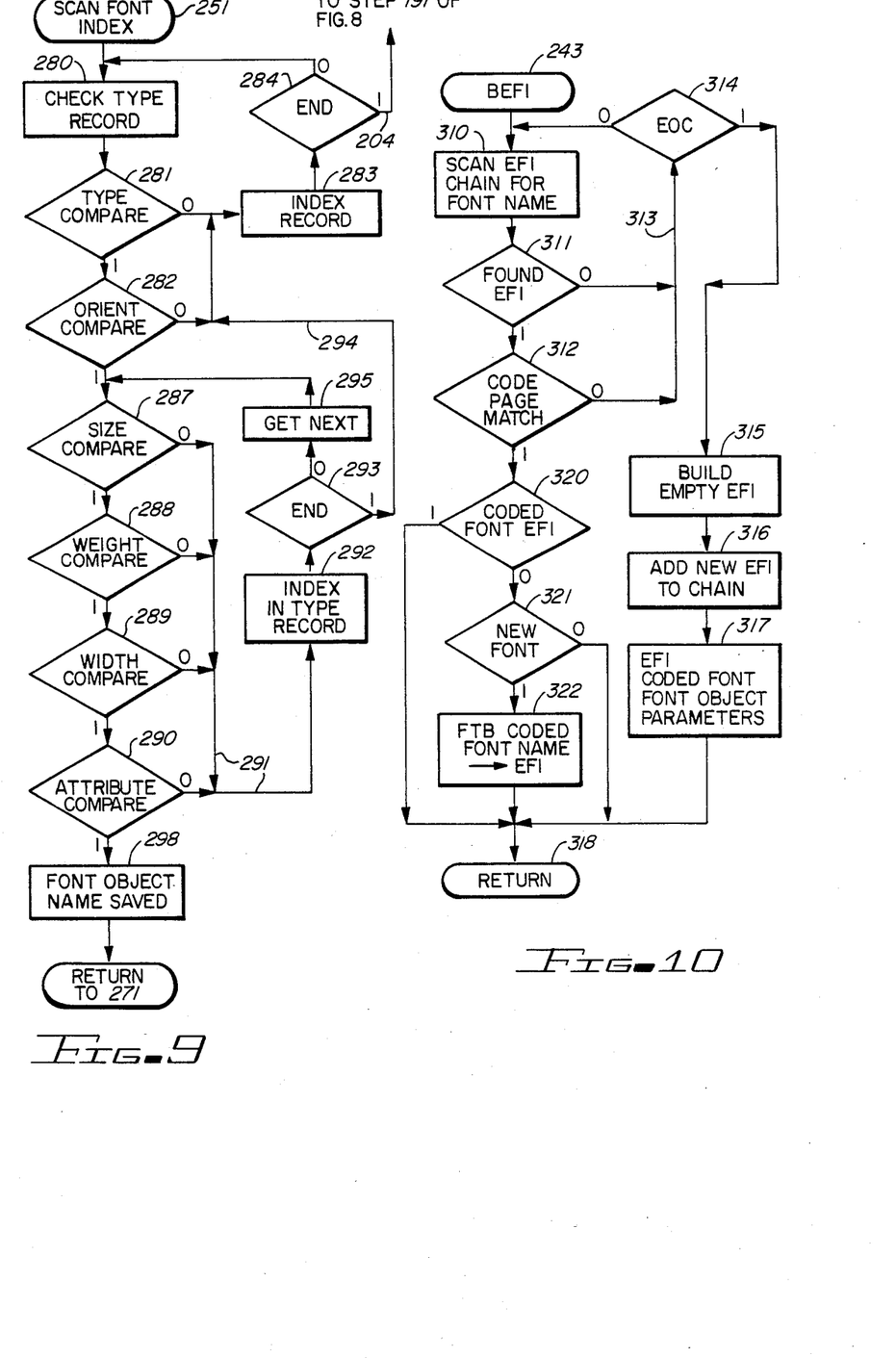
FIG. 9 llustrates machine operations for scanning a font index stored with the FIG. 1 illustrated system.
FIG. 10 shows building an external font information of FIG. 6 as defined by the FIG. 8 illustrated machine operation.

The next step in implicitly defining the font is to scan the font index for typefaces, as described in FIG. 9 and as initiated by step 251 of FIG. 8. Upon completion of the scan, formatter 22 at 270 determines whether or not the typeface was found. If there is no typeface listed in the index corresponding to the one indicated by the begin font parameter being evaluated, formatter 22 then follows logic path 204 returning to step 191 of FIG. 7 to continue the search of FTBs 100 in accordance with the next available parameter in the begin font control word. If a suitable typeface is found, then at 271 the identified FTB has its entry 118 examined to determine whether or not a code page 84 (FIG. 5) has been identified. If not, at 272 the code page which is current is made the code page of the new EFI. This step is achieved by formatter 22 examining the current EFI entry 156 and transferring the contents to the EFI being built. Then the EFI is built as initiated at step 243, previously described. All of the parameter data accumulated in steps 250, 251 and 272 are stored in a work area (not shown) in the main memory (not shown) of host 13 and assigned to formatter 22 in a usual data processing manner. Such storage makes the parameter data available for the FIG. 10 illustrated machine operations.

The font index 103 scan procedure is detailed in FIG. 9. Activation of the machine operation is at FEFI step 251 of FIG. 8. Each record, such as shown in FIG. 6 of the font index 103, is checked at 280 for typeface name in entry 161. At 281 the typeface identified in steps 255 and 256 of FIG. 8 are compared with the typeface name in entry 161 (FIG. 6). If there is a favorable compare, then processing continues at step 282; otherwise, the search or scan will continue. The record address is indexed at 283 to get the next cluster of font indices by the next typeface name. When the record is indexed, whether or not all typeface names have been scanned is checked at 284, if all of the records have been scanned and no favorable compare has occurred, then the next begin font parameter will be examined by step 191 via logic path 204. If at 284 more typeface names can be scanned, the next record is checked at 280 and 281.

Assuming there is a suitable typeface, then at 282 formatter 22 compares the orientation of the current font as shown in field 152 of EFI 102 identified by the top entry in stack 194, i.e., the current orientation, with the orientation in field 164 of the typeface identified in font index 103 (FIG. 6). If there is a non-compare, i.e., a change in orientation which is not permitted through a begin font control word, the record is indexed at 283 and the search for an appropriate font is continued. It should be noted that the record indexing at 283 after a typeface name has been identified in step 281, is a scan of the records of the fonts within a typeface family cluster and an orientation non-compare is equivalent to a typeface non-compare.

When proper orientation and a typeface name has been identified, then a subsequent scan of records within the typeface name is achieved in steps 287 through 295. Steps 287 through 290 are compare steps for comparing various graphics parameter data for ensuring that the identified font is the one desired. At 287 the size (point size) is compared. This is achieved by comparing the size field 167 data contents of the font index 103 with point size field 121 data contents of the identified FTB 100. After a compare, the next parameter data are compared at 288. The weight field 166 of the font index is compared with the weight field 122 of the identified FTB 100. For a favorable compare the next parameter data is compared at 289 for ensuring an appropriate width indication. The contents of width field 168 of font index 103 are compared with the data contents of the width field 123 of FTB 100. Assuming a good compare, the next parameter data being compared are the attributes at step 290. Attributes field 124 of the identified FTB 100 are compared with the attributes field 169 of font index 103. If any of the compare steps 287-290 result in a non-compare, then the next record has to be obtained.

To obtain the next record in a family cluster of records, formatter 22 follows logic path 291 to index the typeface record address at 292. The end of the records is checked at 293. If all parameters data in all of the records within the typeface name have been checked at 293 and there is no compare, then formatter follows path 294 to index to the next family of records at 283. Otherwise, the next record is obtained at 295 with steps 287-290 being repeated until a four-way compare is obtained or end of the records is reached. Upon achieving such a compare, the font object name (FONT NAME) contained in field 160 of font index 103 record is saved in the work area (not shown) at 298 for building an EFI beginning at step 243 (FIG. 8) as described in FIG. 10 and for storing the font object names in field 157 of the EFI 102 that will be built. The FIG. 9 illustration shows how steps 251 and 270 of FIG. 8 are performed in a best mode.

Formatter 22 builds the external font information (EFI) 102 as detailed in FIG. 10. Activation of these machine operations occurs at step 243 of FIG. 8. First of all, at 310 formatter 22 scans the EFI chain beginning with the EFI pointed to by EFIP 174 (FIG. 6) and continuing on using the NEFI pointers 130 in the respective EFIs. If the font name 160 of font index 103 that was identified in the FIG. 9 illustrated machine operations corresponds with the font name 158 of the EFI currently being examined, then further analysis of that EFI proceeds. Otherwise, the scan continues to find a suitable EFI by formatter 22 following logic path 313 to check and branch step 314. At 314 formatter 22 checks for the end of the EFI chain (EOC). If the end of the chain is reached, this means there is no EFI corresponding to the just-defined font.

Assuming that the font names compared equal at step 311, then at 312 formatter 22 compares the code page identified in the current EFI 102 field 156 with the code page entry at 118 of the EFI 102 identified at step 191. For a non-compare, formatter 22 follows logic path 313 as previously described. For a favorable compare both in steps 311 and 312, such that the font names and the code pages match; then at 320, the coded font name 126 is checked. If there is a favorable coded font name compare (the "1" exit of step 320 is taken), then return is taken at 318 to the FIG. 8 illustrated machine operations. Without a coded font compare at 321, formatter 22 determines whether or not a font was defined in the EFI. If not (a new font is needed) at 322 the coded font name of entry 126 of the identified FTB 100 is loaded into the EFI being scanned, i.e., the EFI identified in scan 310. Then formatter 22 returns to the FIG. 8 illustrated machine operations.

In the event the EFI scan results in identifying no suitable EFI 102 (EOC=1 at 314), then a new EFI has to be built by formatter 22. Building begins at step 315 by allocating memory space within the memory of host 13 sufficient to receive the parameter data and other control data shown in FIG. 6 for EFI 102. At 316 that memory space is added to the chain by identifying new EFI area in the NEFI pointer area 130 of the previous last EFI of the chain. The NEFI pointer 130 of the newly built EFI will contain either all zeros or a control code indicating end of chain to be used in a later step 314 for a subsequently build EFI. At 317 the parameter data and other control data are loaded into the allocated memory area using known data-transfer techniques. Remember the data was gathered in the FIG. 8 illustrated machine operations and stored in the work area. Contents of that work area are merely transferred to the new EFI area. Then formatter 22 having completed the EFI, returns to the FIG. 7 illustrated font processing.

Not described herein, for purposes of brevity, is how the control characters and font names are transferred into the text stream. Such techniques are known in the art such as practiced in the above-referenced Document Composition Facility and will not be repeated here for that reason. That is, insertion of control characters in all types in the text streams is a notoriously well-known procedure.

Figure 11:
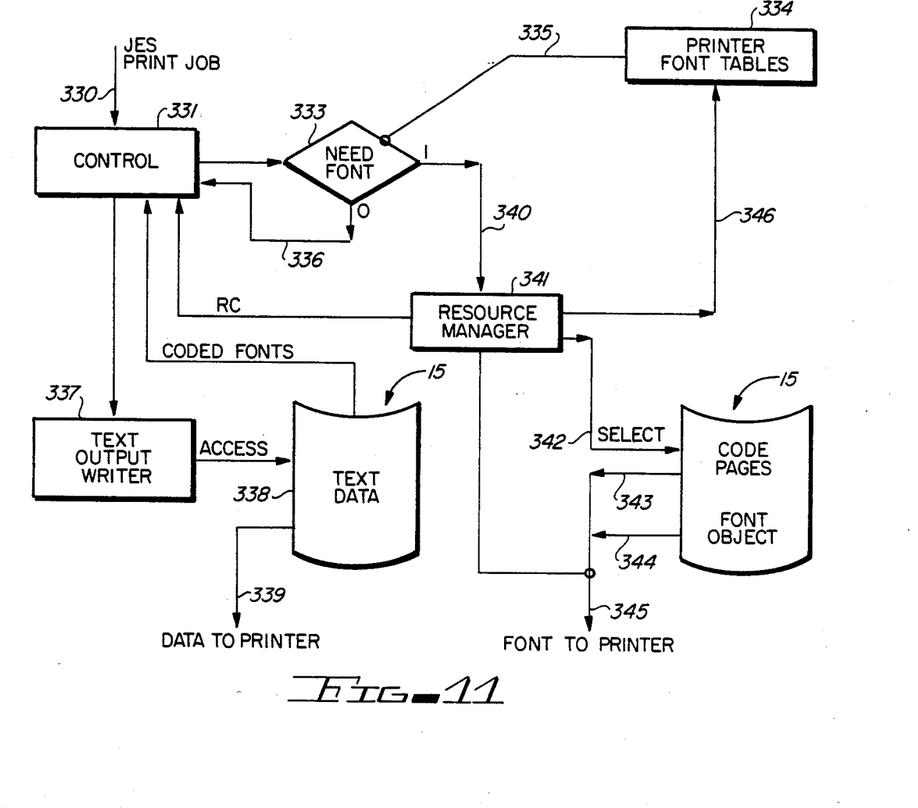
FIG. 11 is a flowchart illustrating the machine operations of an output print control program of the FIG. 1 illustrated system.

When formatter 22 has completed building a text stream with the appropriate format control characters including the above-described font identifications in the form of coded fonts, those formatted data are stored in DASD 15 as a spooled data set awaiting document presenting operations. When a printing operation can ensue, JES 21 activates an output writer or print program 25 for transferring the spooled text data. First, the fonts are transferred to printer 30, the text data follows for the printing operation. A simplified showing of an output writer functioning in accordance with the present invention using coded fonts which are either implicitly or explicitly defined is shown in FIG. 11. Activation of print program 25 is represented in FIG. 11 at 330. Output writers such as print program 25 include a control portion 331 which parses and decodes the received print instructions and control words of the text stream to be printed. The define font control word results in identification of font information at the beginning of the text stream. Such font information is analyzed by control 331 at step 333. Print program 25 keeps a printer font table 334 which represents all of the fonts currently available within printer 30 attached to host 13. At step 333, all of the coded fonts 80 identified in the formatted text data stream are compared with the coded fonts identified in the printer function tables 334. Such comparison is represented by line 335 extending to step 333. If no fonts are needed, then print program 25 follows logic path 336 back to control 331. Then, control 331 activates a text output writer 337 which, in fact, transfers the spooled text from DASD 15 into control 32 of printer 30 for printing, as is well known. On the other hand, if a font is needed at 333, then print program 25 follows logic path 340 to a resource manager 341. Resource manager 341 maintains the resource tables including printer font tables 334. The "need font" indication includes the name of the coded font and the pointers 82, 83 (FIG. 5). Resource manager 341 has address tables which allow the appropriate code pages and font objects to be selected as represented by select arrow 342. Such addressing techniques are well known and not further elaborated upon. In any event, the selected code pages and font objects corresponding to the coded fonts are then transferred respectively over logic paths 343, 344 and then 345 to the printer 25. During this font loading, printer 25 in most instances cannot receive text or perform any printing operations. That is, transferring the font to a printer is an operation preparatory to the printing function. After successfully transferring the code pages and font objects to the printer, resource manager 341 supplies a return code RC to control 331 telling the control that printing may ensue. It is parenthetically noted here that the code page 84 of FIG. 5 may be altered by resource manager 341 to accommodate the addressing characteristics of the font storage (not shown) within printer 25.

It may also occur that the coded fonts may be embedded in the text data as stored at 338 in DASD 15. Accordingly, the text output writer 337 accesses the text data 338 for transmission to the printer 25 over path 339. In the event a coded font is embedded, then that fact along with the identification of the coded font is sent to the control 331. Control 331 then at that time determines whether a font is needed for the ensuing text. If so, printing operations are momentarily interrupted such that resource manager 341 can supply the appropriate code pages with associated font objects of the coded fonts to the printer. Upon completion of updating the font storage of the printer, printing operations resume. Resource manager 341 after transferring each font to the printer 25 correspondingly updates the printer-font table 344 to ensure its currency with the actual printer 25 operational status.

While the invention has been particularly shown and described with reference to preferred embodiments thereof, it will be understood by those skilled in the art that various changes in form and details may be made therein without departing from the spirit and scope of the invention.

What is claimed is:

1. The method of managing a large plurality of electronic fonts in a text-processing system having a computer and data storage, each said font having a plurality of symbol-representing font symbol-representing data suitable for creating visual images of the represented symbols, respectively, said represented symbols all having a plurality of typeface attributes common to all represented symbols in a font the fonts being in families of fonts;

in said text-processing said text-processing system executing the machine-executable steps of:

in said data storage, addressably storing sets of said symbol-representing data as addressable electronic font objects and such that said symbol-representing data sets are individually addressable within any electronic font object by a symbol ID;

in said data storage, storing a plurality of addressable code tables, each said code table having two sections, a first section storing a set of code points identifiable within an expected test stream to be received and each code table having an arbitrary set of such code points, and having a second section storing a subset of said symbol IDs of an electronic font and arranged such that each of said symbol IDs in said subset correspond to a one of said code points in the respective one of said code tables such that receipt of a code point in a text stream identifies a symbol ID in accordance with the code table being addressed for said text stream addressing such code table;

defining and storing in said data storage, coded fonts including giving each coded font an address of a one of said code tables and an address of a one of said addressable electronic font objects such that each includes one address of a one of said code pages and an address of one of said electronic font objects, giving each coded font a name for making each of said coded fonts addressable as a separate entity for selecting it as a currently electronic font;

selecting a one of said coded fonts as said current electronic font for processing said expected text stream for selecting one code table and one electronic font object;

selecting a second electronic font only by identifying a one of said common typeface attributes and making said selection a second electronic font definition;

in said data storage an index of a large plurality of said common typeface attributes and addresses of associated ones of said electronic font objects;

receiving from said expected text stream said second electronic font definition and combining said one selected typeface attribute and said current electronic font, then searching said index to find an address of an electronic font object having said one common typeface in an electronic font within the family of fonts to which the current electronic font is a member; and building a coded font using the address of the same code table as said current electronic font and the address of the electronic font object identified via said index.

2. The method set forth in claim 1 wherein said selecting a second electronic font step includes selecting a plurality of said electronic fonts to be defined fonts, some of said plurality of electronic fonts being defined by a given common typeface attribute while others of said electronic fonts are explicitly defined by a name of such explicitly defined electronic fonts; and arbitrarily establishing a plurality of criteria to be compared with predetermined parameters of said text stream for selecting an electronic font from said plurality of said defined electronic fonts for establishing a new current electronic font.

3. The method set forth in claim 1 including the further steps of:

after receiving said second electronic font definition, storing said second electronic font definition and refrain from using said second font definition;

receiving additional text signals in said text stream and processing same;

receiving a begin font command which refers to said second electronic font definition and after receiving said begin font command doing said combining step which combines said common typeface attribute of said current electronic font and said index to identify a new current electronic font.

4. The method set forth in claim 1 further including the steps of:

defining a plurality of electronic fonts including said first and second electronic fonts and creating a font table block for each defined electronic font wherein each said font table block can include data contents that vary from front table block to font table block including an explicit definition of an electronic font, a coded font, or one or more characteristics of an electronic font object;

receiving a begin font command which refers to a one of said defined electronic fonts, referencing said font table block corresponding to said identified defined electronic font and examining the contents of said referenced font table block to determine whether explicit or implicit electronic font definition is required as indicated by the data content being a name of an electronic font or a typeface attribute, respectively;

when an implicit electronic font definition is required, creating a new current electronic font through said combining step and if an explicit electronic font is defined, finding the coded font identified by the explicit electronic font and referring to the code page and electronic font object identified in the found coded font as a new current electronic font; and for each new current electronic font, establishing an external font information block which completes the definition of any electronic font that is currently being used with reference to a font table block from which said external font information block was derived and enter an identification of said external font information in said font table block such that subsequent references to said font table block will indicate that an electronic font has been defined in accordance with said defined electronic font.

5. The method set forth in claim 4 wherein subsequent to defining a second electronic font and before executing said combining step, executing all of the below-identified steps:

receiving a begin font command having a plurality of references to define electronic fonts and typeface attributes and arranged in a predetermined order, scanning said defined electronic font identifications and typeface attributes received with said begin font command and selecting a first one of said defined electronic font identifications or typeface attributes in said ordered sequence for constructing a coded font as set forth in said defining and storing step to be used with text following said begin font command.

6. The machine-implemented method of selecting electronic fonts for use in presenting text and graphics, storing a large plurality of electronic font objects each of which includes a plurality of graphics-representing signals for graphics presentable by a plurality of graphics presentation devices, each of said stored graphics signals being addressable by a respective symbol ID, storing a large plurality of code pages each of which has two sections, a first section storing a plurality of code points corresponding to coded representations of text and graphics within a text stream expected to be received and a second section containing a plurality of symbol IDs, one for each of said code points in said first section whereby a code point can address a stored graphic in any one of said font electronic objects via such code page;

in a programmable electronic machine, executing the machine-executable steps of:

defining a plurality of electronic fonts as coded fonts by storing in a logically-related storage position the address of a code page with an address of a font object such that at least a subset of graphics in the electronic font object becomes addressable via an identified one of said coded fonts, each coded font having a different name;

activating an electronic font by listing a plurality of coded font names and comparing such list with the defined electronic coded font names in a scan sequence having a predetermined priority of scanning with a first identity of comparison of a listed coded font name with a defined electronic font name identifying the activated electronic font;

then processing a received text stream using said activated electronic font;

receiving a second electronic font activation which activation includes a second list of coded fonts, comparing said second list of coded fonts with said defined electronic fonts in a predetermined sequence and selecting a coded font that has a name identical to the listed font name as the electronic font to be used in presenting the ensuing text.

7. The invention as set forth in claim 6 further including the steps of:

storing typographic parameter data for each of said electronic font objects in groups of such parameters by a font family;

receiving a third electronic font activation having a one of said typographic parameters;

comparing said one typographic parameter datum in said third electronic font activation and said second selected electronic font with said parameters in said stored typographic parameters in the family of electronic fonts to which said second activated electronic font is a member and selecting a third coded font in accordance with an identity of said one typographic parameter plus said font family as a third selected electronic font for presenting ensuing text in said text stream.

8. In a document preparation system having a programmable digital computer, input means coupled to said programmable digital computer for supplying input text and graphics digital signals thereto for being converted into a visual document, output means coupled to said programmable digital computer for receiving formatted graphic and text signals therefrom for creating the visual document using said supplied input text and graphic signals as an indication of the informational content of the document, data storage means coupled to said programmable digital computer for storing programs of instructions for enabling said programmable digital computer to format the supplied text and graphic signals for visual presentation in the document, a large plurality of electronic font sets of electronic font-generating signals stored in said data storage means for enabling said output means to create graphic characters in accordance with said supplied text and graphic signals, the said graphic characters being indentifiable within any of said electronic font sets by the supplied text and graphic signals and having a shape and characteristic in accordance with said stored electronic font-generating signals of the respective electronic font sets;

first index means in said data storage means storing a name for each of said electronic font sets along with a plurality of font characteristics and attributes and a pointer signal indicating the address of the corresponding stored one of said electronic font sets;

directory means in said data storage means having a predetermined number of entries for storing corresponding addresses of predetermined ones of said character graphics of predetermined ones of said electronic font sets, said electronic font sets including a number addressable character graphics greater than the number of entries in predetermined ones of said directory means; and font control program indicia in said data storage means for enabling said programmable processor to respond to predetermined ones of said supplied text and graphic digital signals to scan said first index means for identifying an electronic font set having a predetermined set of characteristics and attributes relatable in a predetermined manner to said predetermined ones of supplied text and graphic signals as a source of electronic fonts to be used in visually presenting said document and having directory selecting program indicia to select a directory means for use with said identified electronic font set such that the character graphics to be used in document presentation are inferentially selected via said predetermined set of characteristics and attributes.

9. In the document preparation system set forth in claim 8, further including, in combination:

second ones of said text and graphics signals including an indication of a coded font having a name, a pointer to a given one of said directory means and a pointer to a given one of said electronic font sets whereby electronic fonts are explicitly selected via said text and graphic signals, and explicit font-selection program indicia in said font control program indicia for enabling said programmable digital computer to respond to said second ones of said text and graphics signals for selecting a one of said directory means and a one of said electronic font sets for use by said output means in presenting a document.

10. In the document preparation system set forth in claim 9, further including, in combination:

external font index means in said data storage means for enabling said programmable computer to store characteristics, attributes, identification of an electronic font set and directory means with respect to current formatting of said supplied text and graphics signals for visual presentation, said external font index means being addressable by said stored programs of instructions at least while said programmable digital computer is formatting said supplied signals into a formatted set of signals for use by said output means;

font table block means in said data storage means for enabling said programmable computer to store said predetermined ones of said supplied text and graphic signals for indicating predetermined one of said characteristics and attributes of a font to be selected for use in presenting a document;

FTB program indicia stored in said data storage means for enabling said programmable digital computer to store said predetermined ones of said text and graphic signals and said second ones of said text and graphic signals; and scan program indicia in said font control program indicia for enabling said programmable digital computer to examine said font table block means for scanning said first index means to implicitly define an electronic font or to select a directory means and an electronic font set via said explicit font-selection program means.

* * * * *